United States Patent
Kitahara et al.

(10) Patent No.: US 11,371,870 B2
(45) Date of Patent: Jun. 28, 2022

(54) AIR FLOW RATE MEASUREMENT DEVICE

(71) Applicant: DENSO CORPORATION, Kariya (JP)

(72) Inventors: Noboru Kitahara, Kariya (JP); Teruaki Kaifu, Kariya (JP); Tomoaki Nakano, Kariya (JP)

(73) Assignee: DENSO CORPORATION, Kariya (JP)

( * ) Notice: Subject to any disclaimer, the term of this patent is extended or adjusted under 35 U.S.C. 154(b) by 19 days.

(21) Appl. No.: 16/928,078

(22) Filed: Jul. 14, 2020

(65) Prior Publication Data
US 2020/0340840 A1 Oct. 29, 2020

Related U.S. Application Data (63) Continuation of application No. PCT/JP2019/001138, filed on Jan. 16, 2019.

(30) Foreign Application Priority Data

Jan. 26, 2018 (JP) .............................. JP2018-011372

(51) Int. Cl.
  *G01F 1/72* (2006.01)
  *G01F 1/696* (2006.01)
  *G01F 1/698* (2006.01)

(52) U.S. Cl.
  CPC ................ G01F 1/72 (2013.01); G01F 1/698 (2013.01); G01F 1/6965 (2013.01)

(58) Field of Classification Search
  CPC .......... G01F 1/72; G01F 1/6965; G01F 1/698; G01F 25/0007
  See application file for complete search history.

(56) References Cited

U.S. PATENT DOCUMENTS

| | | | |
|---|---|---|---|
| 6,334,083 B1 | 12/2001 | Aono et al. | |
| 6,520,009 B2 * | 2/2003 | Kobayashi | G01F 1/6965 123/478 |
| 6,556,929 B1 * | 4/2003 | Kleinhans | F02D 41/187 702/45 |

(Continued)

FOREIGN PATENT DOCUMENTS

| | | |
|---|---|---|
| JP | 11-083584 | 3/1999 |
| JP | 2003-004496 | 1/2003 |
| JP | 2014-020212 | 2/2014 |

*Primary Examiner* — Freddie Kirkland, III
(74) *Attorney, Agent, or Firm* — Nixon & Vanderhye P.C.

(57) ABSTRACT

An air flow rate measurement device includes a flow rate detection unit, a detected flow rate response compensation unit, a pulsation amplitude calculation unit, a correction value calculation unit, and an error correction unit. The flow rate detection unit detects a detected flow rate. The detected flow rate response compensation unit advances a response time of the detected flow rate and calculating a compensation flow rate which is an output obtained by compensating for a response delay of the detected flow rate. The pulsation amplitude calculation unit calculates a pulsation amplitude correlated with a pulsation amplitude in the detected flow rate. The correction value calculation unit calculates a pulsation correction value which is a value for correcting the compensation flow rate based on the pulsation amplitude. The error correction unit corrects the compensation flow rate based on the pulsation correction value.

12 Claims, 9 Drawing Sheets

(56) References Cited

U.S. PATENT DOCUMENTS

| | | | |
|---|---|---|---|
| 7,286,925 B2* | 10/2007 | Lang | G01F 1/72 |
| | | | 701/114 |
| 10,006,792 B2* | 6/2018 | Morinaga | G01F 5/00 |
| 10,724,881 B2* | 7/2020 | Morinaga | F02D 41/187 |
| 10,975,793 B2* | 4/2021 | Ito | G01F 1/696 |
| 2002/0045982 A1 | 4/2002 | Aono et al. | |
| 2002/0056319 A1* | 5/2002 | Kobayashi | G01F 1/6965 |
| | | | 73/204.22 |
| 2006/0224298 A1* | 10/2006 | Lang | G01F 1/72 |
| | | | 701/114 |
| 2017/0343400 A1* | 11/2017 | Morinaga | G01F 5/00 |
| 2021/0108952 A1* | 4/2021 | Kitahara | G01F 1/72 |
| 2021/0247219 A1* | 8/2021 | Isoya | G01F 1/688 |

* cited by examiner

AIR FLOW RATE MEASUREMENT DEVICE

CROSS REFERENCE TO RELATED APPLICATION

This application is a continuation application of International Patent Application No. PCT/JP2019/001138 filed on Jan. 16, 2019, which designated the U.S. and based on and claims the benefits of priority of Japanese Patent Application No. 2018-011372 filed on Jan. 26, 2018. The entire disclosure of all of the above applications is incorporated herein by reference.

TECHNICAL FIELD

The present disclosure relates to an air flow rate measurement device.

BACKGROUND

An air flow rate measurement device corrects an air flow rate based on a correction map including a pulsation amplitude ratio of an air flow rate and a pulsation frequency caused by a rotation speed of an internal combustion engine.

SUMMARY

An object of the present disclosure is to provide an air flow rate measurement device that improves measurement accuracy of the air flow rate.

An air flow rate measurement device according to the present disclosure includes a flow rate detection unit, a detected flow rate response compensation unit, a pulsation amplitude calculation unit, a correction value calculation unit, and an error correction unit.

The flow rate detection unit can detect a detected flow rate which is an output corresponding to a flow rate of air flowing in a flow path connected to an internal combustion engine. The detected flow rate response compensation unit can advance the response time of the detected flow rate, and can calculate a response compensation flow rate which is an output obtained by compensating for the response delay of the detected flow rate. The pulsation amplitude calculation unit can calculate a pulsation amplitude that correlates with the pulsation amplitude in the detected flow rate. The correction value calculation unit can calculate a pulsation correction value, which is a value for correcting a response compensation flow rate, based on the pulsation amplitude. The error correction unit corrects the response compensation flow rate based on the pulsation correction value.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Hereinafter, an embodiment of an air flow rate measurement device will be described with reference to the drawings. In the description of the plurality of embodiments, substantially the same configuration is denoted by the same reference numeral. When referred to as the present embodiment, a plurality of embodiments may be included. The air flow rate measurement device according to the present embodiment is used for an engine system including an engine that is an internal combustion engine. First, an engine system using the air flow rate measurement device will be described.

Figure 1:
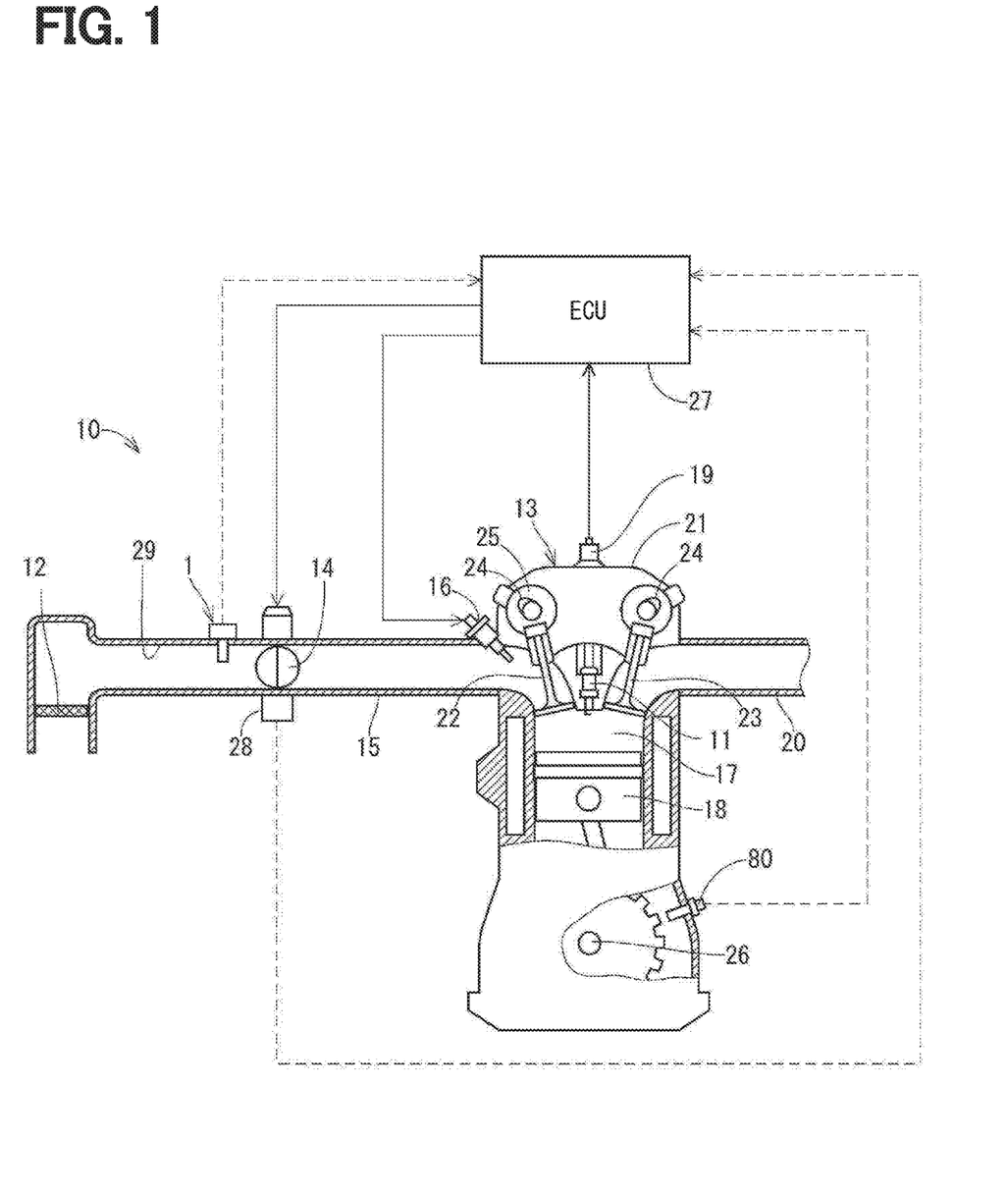
FIG. 1 is a configuration diagram of an engine system using an air flow rate measurement device according to one embodiment.

As shown in FIG. 1, the engine system 10 includes a spark ignition type engine 13. The engine 13 is, for example, a multi-cylinder engine such as a four-cylinder engine. In a sectional view of FIG. 1, only one cylinder is shown. The configuration described below is similarly provided for other cylinders not shown.

In the engine 13, an ignition of an air-fuel mixture in a combustion chamber 17 occurs by applying a high voltage from an ignition coil 19 to an ignition plug 11. When a high voltage is applied to the ignition plug 11, a spark discharge occurs in the combustion chamber 17. A mixture of intake air supplied from an intake manifold 15 through an air cleaner 12 and a throttle valve 14 and fuel injected from an injector 16 is burned in the combustion chamber 17. A piston 18 reciprocates due to an explosive force during the combustion. The combustion gas is released into the atmosphere through an exhaust manifold 20 and the like.

Further, the engine 13 is provided with a crank angle sensor 80. The crank angle sensor 80 detects a crank angle of a crankshaft 26 and can detect an engine speed N, which is the speed of the engine 13.

An intake valve 22 is provided at an intake port of a cylinder head 21 which is an inlet of the combustion chamber 17. An exhaust valve 23 is provided at an exhaust port of the cylinder head 21 which is an outlet of the combustion chamber 17. The intake valve 22 and the exhaust valve 23 are opened and closed by a valve drive mechanism 24. A valve timing of the intake valve 22 is adjusted by a variable valve mechanism 25.

An electronic control unit 27 is mainly configured by a microcomputer. The electronic control unit 27 includes a CPU, a readable non-transitory tangible memory medium, a ROM, an I/O, and a bus line connecting these components. Each process of the electronic control unit 27 may be a software process by executing a program stored in advance in a tangible memory device such as a ROM by a CPU, or may be a hardware process by a dedicated electronic circuit. In the figure, the electronic control unit 27 is represented as "ECU".

The electronic control unit 27 receives detection signals from a throttle opening sensor 28 and an air flow rate measurement device 1 as indicated by broken arrows. The electronic control unit 27 calculates a combustion injection time and the like based on the detection signals from these sensors, and controls an operating state of the engine 13 by driving the throttle valve 14 and the injector 16 as indicated by solid arrows.

One Embodiment

The air flow rate measurement device 1 is provided in an intake passage 29 between the air cleaner 12 and the throttle valve 14. The air flow rate measurement device 1 is capable of measuring an air flow rate taken into the engine system 10. The air flow rate measurement device 1 includes a housing, and each unit is housed in the housing. The air flow rate measurement device 1 is mainly configured by a microcomputer or a dedicated electronic circuit, like the electronic control unit 27.

Figure 2:
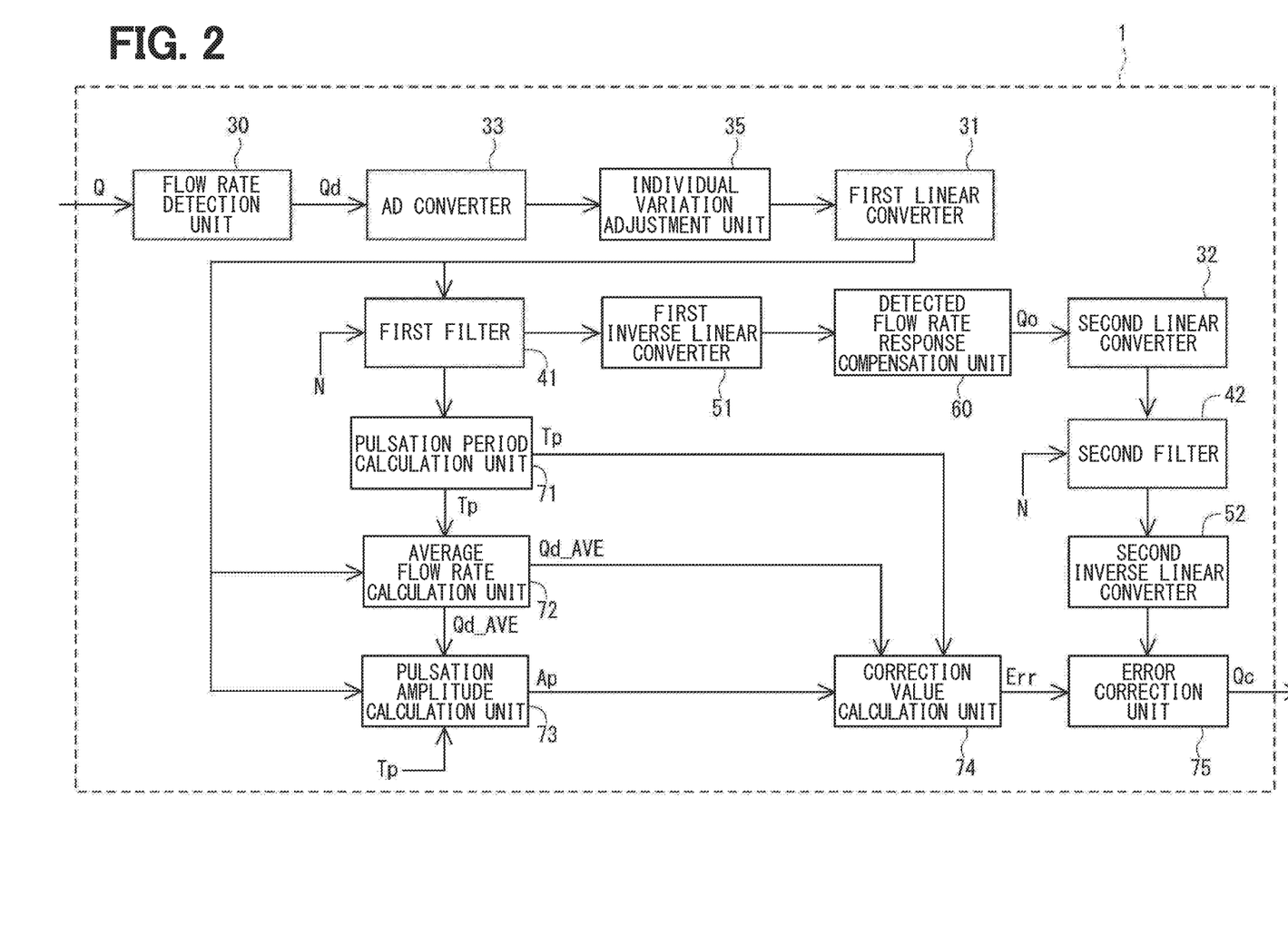
FIG. 2 is a block diagram illustrating the air flow rate measurement device according to one embodiment.

As shown in FIG. 2, the air flow rate measurement device 1 includes a flow rate detection unit 30, an AD converter 33, an individual variation adjustment unit 35, a first linear converter 31, a first filter 41, and a first inverse linear converter 51. In addition, the air flow rate measurement device 1 includes a detected flow rate response compensation unit 60, a second linear converter 32, a second filter 42, and a second inverse linear converter 52. Further, the air flow rate measurement device 1 includes a pulsation cycle calculation unit 71, an average flow rate calculation unit 72, a pulsation amplitude calculation unit 73, a correction value calculation unit 74, and an error correction unit 75.

Figure 3:
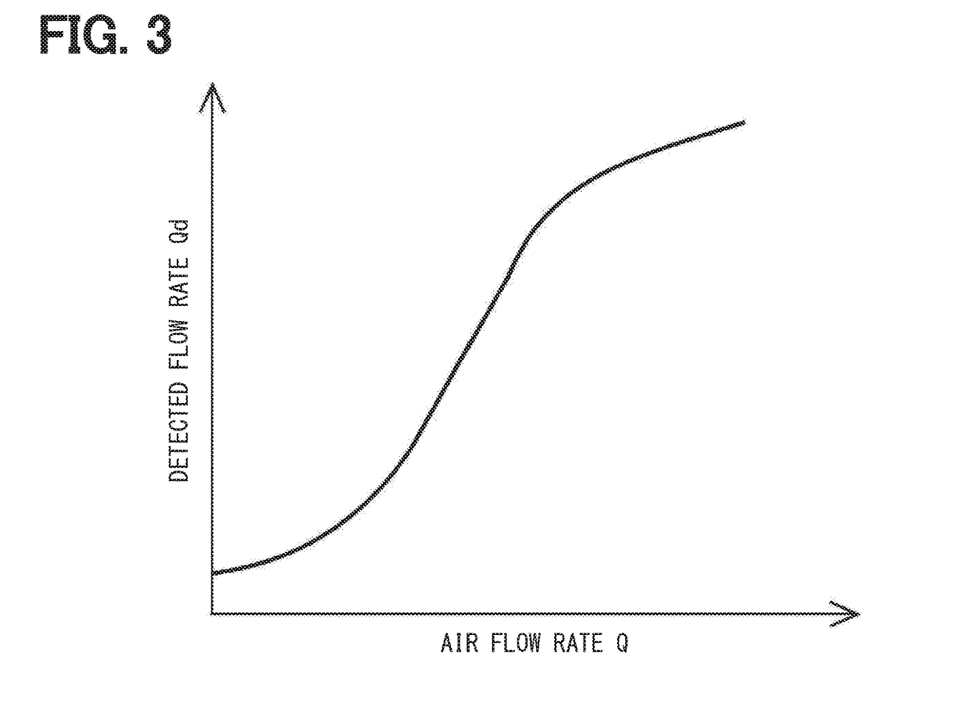
FIG. 3 is a relationship diagram of an air flow rate and a detected flow rate of the air flow rate measurement device according to one embodiment.

As shown in FIG. 3, the flow rate detection unit 30 is configured by an analog circuit, and can detect a detected flow rate Qd which is an output corresponding to an air flow rate Q which is a flow of air flowing through the intake passage 29. In addition, the flow rate detection unit 30 detects the detected flow rate Qd based on the heat transfer with the air flowing through the intake passage 29 and the temperature change accompanying the heat transfer. The detected flow rate Qd is output to the AD converter 33.

The AD converter 33 discretizes the detected flow rate Qd changing continuously and measures the detected flow rate Qd at a constant sampling time interval $\Delta t$. The sampling time interval $\Delta t$ is set arbitrarily. The k-th detected flow rate Qd measured by the AD converter 33 is referred to as Qd (k). k is a natural number.

The individual variation adjustment unit 35 can correct the detected flow rate Qd. The individual variation adjustment unit 35 can detect a device temperature X that is a temperature of the air flow rate measurement device 1. As the device temperature X increases, the detected flow rate Qd increases. For this reason, the individual variation adjustment unit 35 corrects the detected flow rate Qd based on the device temperature X. In addition, the flow rate detection unit 30 and the AD converter 33 have individual variations. Therefore, the individual variation adjustment unit 35 corrects the detected flow rate Qd so as to match the characteristic of the detected flow rate Qd with respect to the air flow rate Q as a reference. Due to the individual variation adjustment unit 35, the detected flow rate Qd is less affected by the device temperature X and the individual variation of the flow rate detection unit 30.

Figure 4:
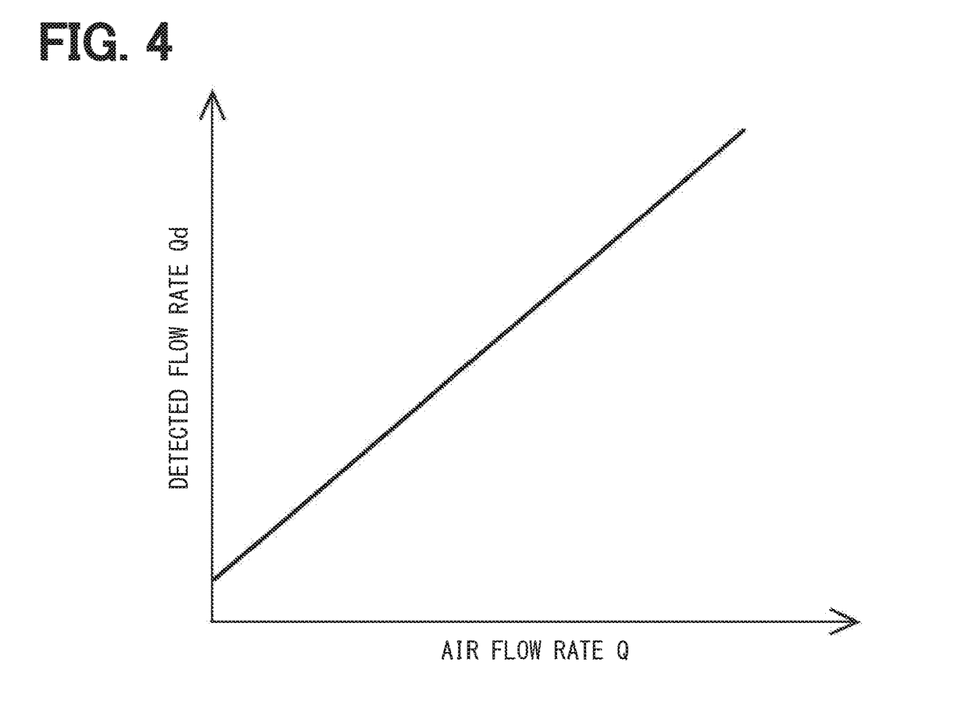
FIG. 4 is a relationship diagram of an air flow rate and a detected flow rate for explaining a process of a linear converter of the air flow rate measurement device according to one embodiment.

As shown in FIG. 4, the first linear converter 31 can convert a relationship between the detected flow rate Qd and the air flow rate Q into a linear relationship. The first linear converter 31 performs a linear approximation based on a plurality of points representing the relationship between the air flow rate Q and the detected flow rate Qd before the linear conversion. The linearly converted detected flow rate Qd is output to the first filter 41, the average flow rate calculation unit 72, and the pulsation amplitude calculation unit 73. Here, the function used for the linear approximation may be a quadratic function or more.

Figure 5:
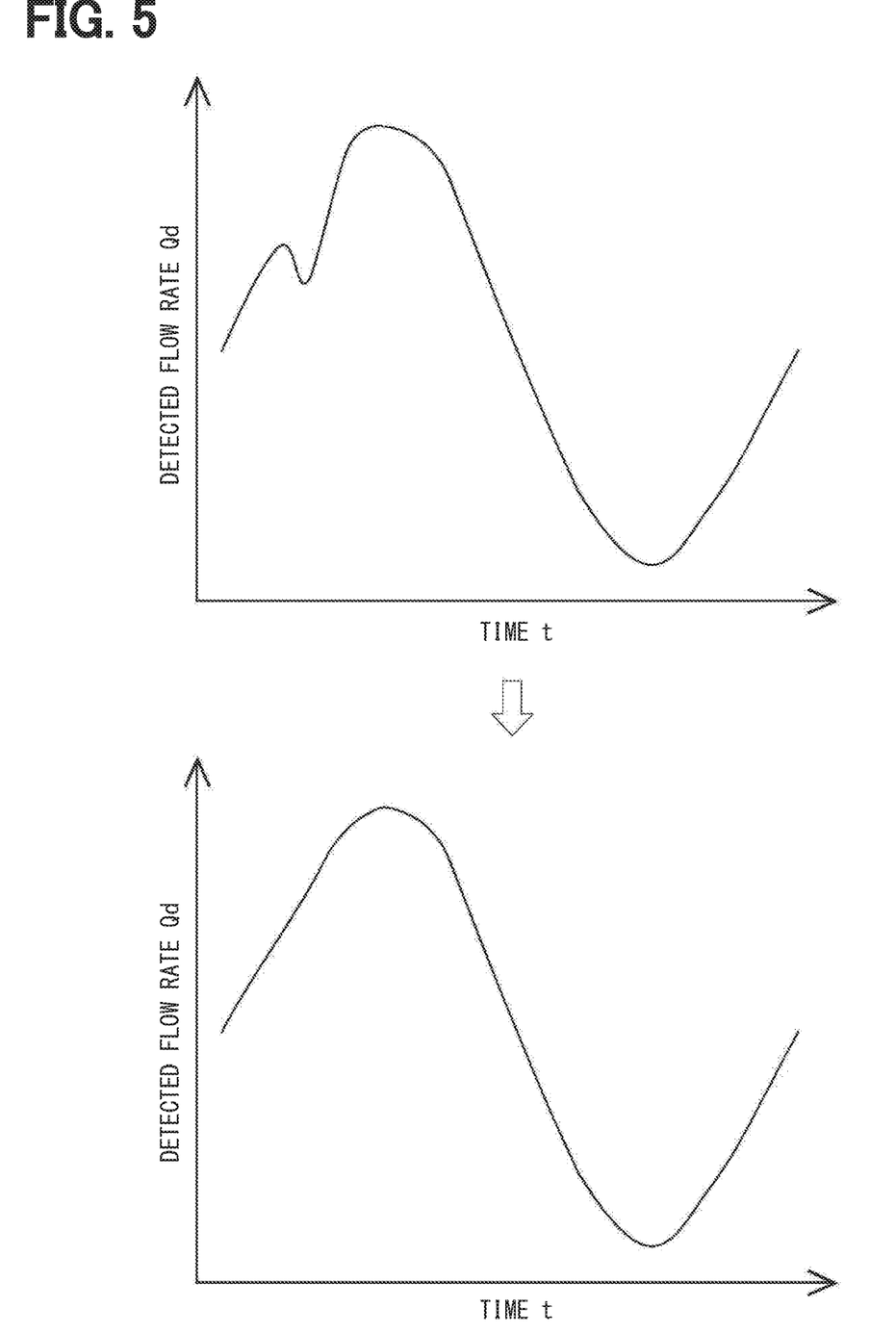
FIG. 5 is a relationship diagram of a time and a detected flow rate for explaining a process of a filter of the air flow rate measurement device according to one embodiment.

As illustrated in FIG. 5, the first filter 41 can remove or attenuate components having a frequency equal to or higher than a first frequency f1 from the detection value linearly converted by the first linear converter 31. The first filter 41 is a low-pass filter, and can remove or attenuate a component of the detected flow rate Qd that is equal to or higher than the first frequency f1. A transfer function of the first filter 41 is represented by the following relational expression (1). The first filter 41 has a primary delay element. $\tau f1$ represents a time constant related to the first filter 41, and is set similarly to the first frequency f1.

$$1/(1+\tau f1 \times s) \tag{1}$$

Figure 6:
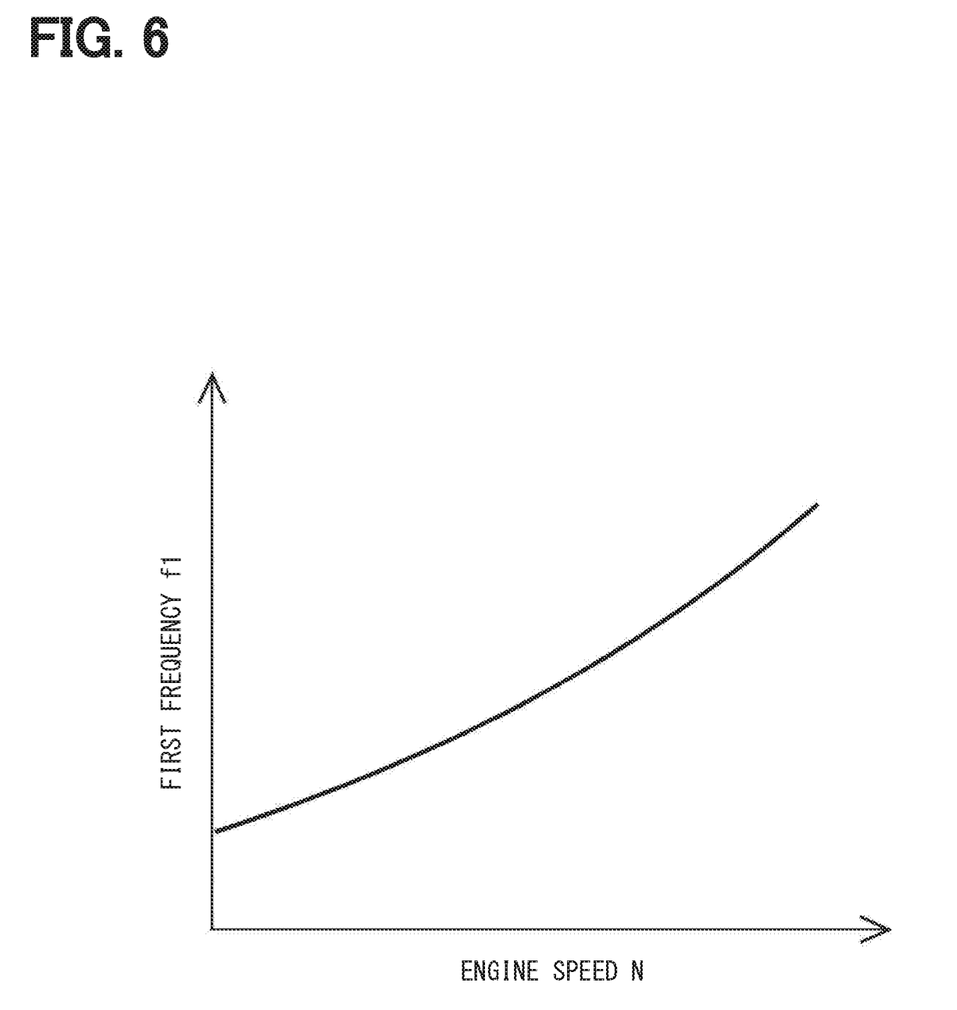
FIG. 6 is a relationship diagram of an engine speed and a frequency for explaining a process of a filter of the air flow rate measurement device according to one embodiment.

As shown in FIG. 6, the first frequency f1 is equal to or higher than 20 Hz and is set based on the engine speed N. The first frequency f1 is set to increase as the engine speed N increases. The first filter 41 acquires the engine speed N from the crank angle sensor 80, and sets the first frequency f1 based on the engine speed N. The first filter 41 can remove or attenuate a relatively high frequency band component of the detected flow rate Qd based on the first frequency f1, and can remove or attenuate noise. The detected flow rate Qd that has passed through the first filter 41 is output to the first inverse linear converter 51 and the pulsation cycle calculation unit 71.

The first inverse linear converter 51 can perform an inverse conversion of the conversion performed by the first linear converter 31 on the detected flow rate Qd with respect to the air flow rate Q. The first inverse linear converter 51 performs an inverse operation of the conversion performed by the first linear converter 31, thereby performing the inverse conversion of the detected flow rate Qd. The detected flow rate Qd subjected to the inverse linear conversion is output to the detected flow rate response compensation unit 60.

Figure 7:
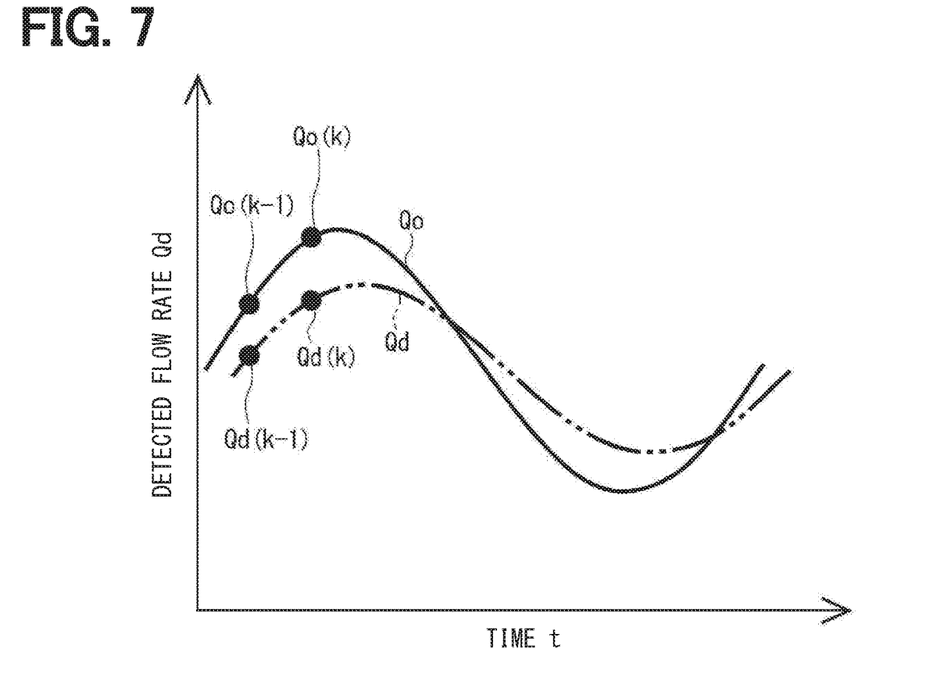
FIG. 7 is a relationship diagram of a time, a detected flow rate, and a response compensation flow rate for explaining a process of a detected flow rate response compensation unit of the air flow rate measurement device according to one embodiment.

As shown in FIG. 7, the detected flow rate response compensation unit 60 can advance a response time of the detected flow rate Qd via the first inverse linear converter 51, and can compensate for the response delay of the detected flow rate Qd. Further, the detected flow rate response compensation unit 60 can change a flow rate change amount $\Delta Qd$, which is a change amount of the detected flow rate Qd. The detected flow rate response compensation unit 60 calculates so that the flow rate change amount ΔQd increases, and calculates a response compensation flow rate Qo that is a value obtained by compensating for a response delay of the detected flow rate Qd. In FIG. 7, the response compensation flow rate Qo with respect to time t is indicated by a solid line, and the detected flow rate Qd with respect to time t is indicated by a two-dot chain line.

The detected flow rate response compensation unit 60 calculates the flow rate change amount ΔQd using a sampling time interval Δt corresponding to a time change, a time constant T, and a linear function of the detected flow rate Qd as shown in the following relational expression (2). Further, the detected flow rate response compensation unit 60 calculates the response compensation flow rate Qo based on the flow rate change amount ΔQd and the detected flow rate Qd. The detected flow rate response compensation unit 60 calculates the response compensation flow rate Qo using the inverse operation with the primary delay. In the relational expression (2), ΔQd (k) is a change amount corresponding to Qd (k). Qo (k) is a response compensation flow rate Qo corresponding to Qd (k). The time constant T means a response of the sensor, and is an amount that gives a measure of response time of an output to an input. The time constant T may be simply a fixed value, or may be calculated as a function of the detected flow rate Qd. The time constant T is selected according to the sensor. The response compensation flow rate Qo is output to the second linear converter 32.

$$Qo(k) = \Delta Qd(k) + Qd(k-1) = \tag{2}$$
$$(Qd(k) - Qd(k-1)) \div (1 - e^{-(\Delta t/\tau)}) + Qd(k-1)$$

The second linear converter 32 can linearly convert a relationship between the air flow rate Q and the response compensation flow rate Qo. The second linear converter 32 performs linear approximation using the response compensation flow rate Qo at a plurality of points. The linearly converted response compensation flow rate Qo is output to the second filter 42.

The second filter 42 is a low-pass filter similarly to the first filter 41, and can remove or attenuate the response compensation flow rate Qo that is equal to or higher than a second frequency f2. The second frequency f2 is the same as the first frequency f1, and is set based on the engine speed N. Similarly to the first filter 41, the second filter 42 sets the second frequency f2 based on the engine speed N. In addition, the second filter 42 can remove or attenuate a relatively high frequency band component of the response compensation flow rate Qo based on the second frequency f2, can attenuate an amplitude of the response compensated pulsation, and can remove or attenuate noise. The response compensation flow rate Qo that has passed through the second filter 42 is output to the second inverse linear converter 52.

The second inverse linear converter 52 can perform an inverse conversion of the conversion performed by the second linear converter 32 on the response compensation flow rate Qo with respect to the air flow rate Q. The second inverse linear converter 52 performs an inverse operation of the conversion performed by the second linear converter 32, thereby inversely converting the response compensation flow rate Qo. The inversely converted response compensation flow rate Qo is output to the error correction unit 75.

Figure 8:
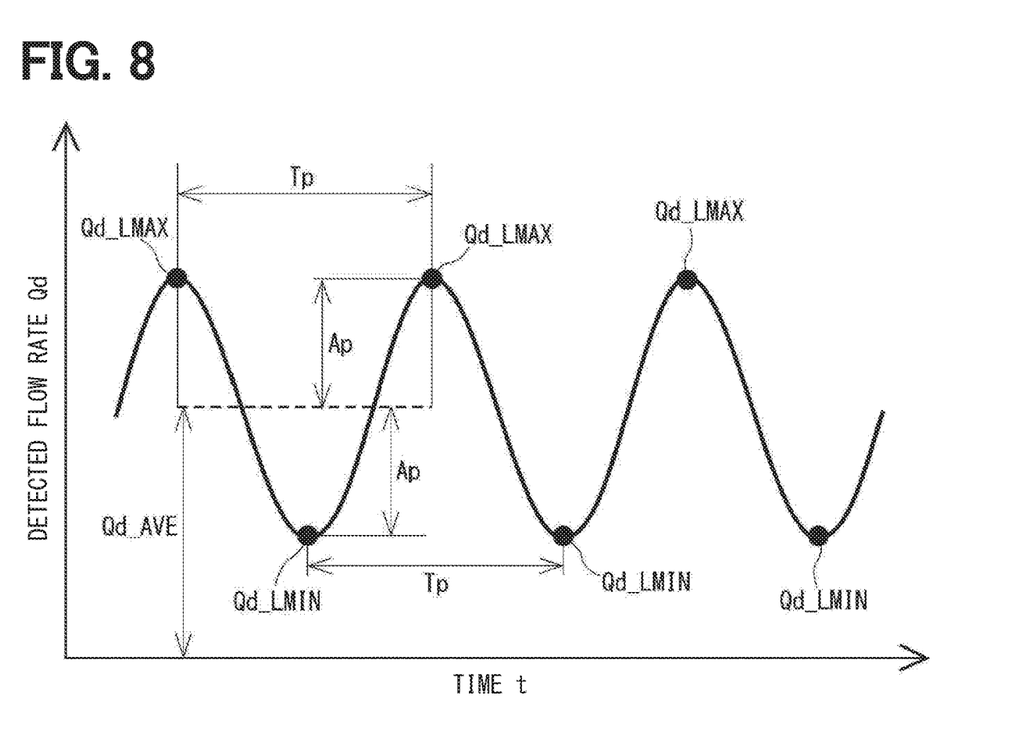
FIG. 8 is a relationship diagram of a time and a detected flow rate for explaining a process of a pulsation cycle calculation unit, an average flow rate calculation unit, and a pulsation amplitude calculation unit of the air flow rate measurement device according to one embodiment.

As shown in FIG. 8, the pulsation cycle calculation unit 71 can calculate a pulsation cycle Tp, which is a cycle of the pulsation, from the detected flow rate Qd from which noise has been removed with respect to time t. The pulsation cycle Tp is caused by the engine speed N.

The pulsation cycle calculation unit 71 calculates a point at which a slope of the tangent becomes zero, a point at which a change amount becomes zero, or a point at which a sign of the change amount in the detected flow rate Qd changes with respect to time t based on the detected flow rate Qd from which noise has been removed with respect to time t. Accordingly, the pulsation cycle calculation unit 71 detects a maximum value Qd_LMAX and a minimum value Qd_LMin. In addition, in the present specification, zero shall include a commonsense error range.

The pulsation cycle calculation unit 71 calculates the time between two maximum values Qd_LMAX or the time between two minimum values Qd_LMin as a pulsation cycle Tp. The pulsation cycle Tp is output to the average flow rate calculation unit 72, the pulsation amplitude calculation unit 73, and the correction value calculation unit 74.

The average flow rate calculation unit 72 can calculate an average flow rate Qd_AVE, which is an average value of the detected flow rate Qd with respect to time t, based on the linearly converted detected flow rate Qd. The average flow rate calculation unit 72 sets a time t for obtaining an average value based on the pulsation cycle Tp. The calculated average flow rate Qd_AVE is output to the pulsation amplitude calculation unit 73 and the correction value calculation unit 74. In FIG. 8, the average flow rate Qd_AVE is calculated in one cycle of the pulsation cycle Tp. The average flow rate Qd_AVE may be calculated from two or more pulsation cycles Tp.

The pulsation amplitude calculation unit 73 can calculate the pulsation amplitude Ap correlated with an amplitude of the pulsation in the detected flow rate Qd based on the maximum value Qd_LMAX, the minimum value Qd_LMin, and the average flow rate Qd_AVE. The pulsation amplitude calculation unit 73 calculates the pulsation amplitude Ap by, for example, subtracting the average flow rate Qd_AVE from the maximum value Qd_LMAX. Alternatively, the pulsation amplitude calculation unit 73 calculates the pulsation amplitude Ap by, for example, subtracting the minimum value Qd_LMin from the average flow rate Qd_AVE.

The correction value calculation unit 74 can calculate a pulsation correction value Err, which is a value for correcting an error due to pulsation and a value for correcting the response compensation flow rate Qo, based on the pulsation cycle Tp, the average flow rate Qd_AVE, and the pulsation amplitude Ap. The correction value calculation unit 74 calculates a pulsation rate P using a preset relationship diagram including the pulsation cycle Tp, the average flow rate Qd_AVE, and the pulsation amplitude Ap.

Figure 9:
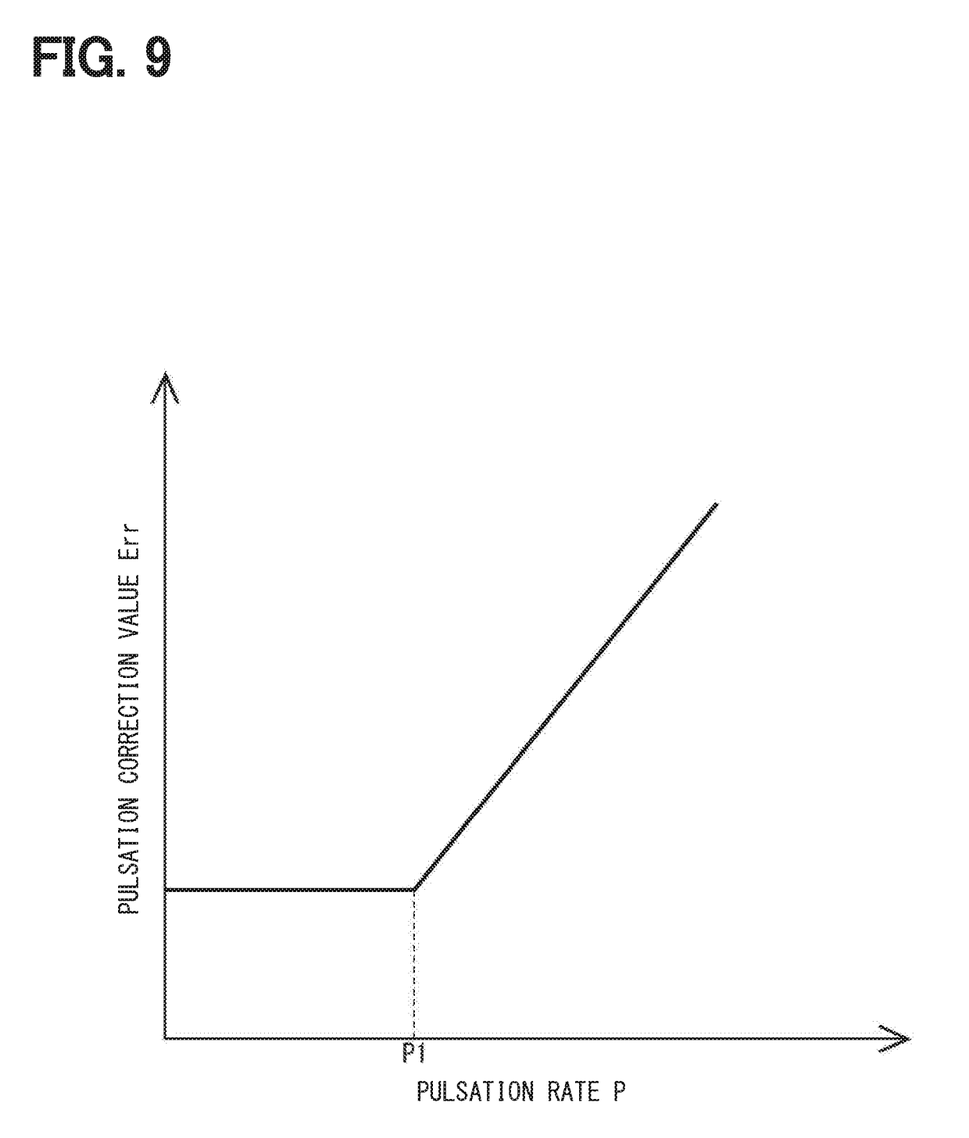
FIG. 9 is a relationship diagram of a pulsation rate and a pulsation correction value for explaining a process of a correction value calculation unit of the air flow rate measurement device according to the embodiment.

As shown in FIG. 9, for example, when the pulsation rate P is equal to or less than a predetermined value P1, the pulsation correction value Err is set to be constant. When the pulsation rate P exceeds the predetermined value P1, the pulsation correction value Err is set so that the pulsation correction value Err increases as the pulsation rate P increases. The pulsation correction value Err is output to the error correction unit 75. In addition, in the present specification, the term "constant" includes a commonsense error range. The predetermined value P1 is arbitrarily set according to the engine speed N or the pulsation cycle Tp, the average flow rate Qd_AVE, and the pulsation amplitude Ap.

The error correction unit 75 corrects the response compensation flow rate Qo via the second inverse linear converter 52 based on the pulsation correction value Err. The error correction unit 75 calculates a correction flow rate Qc, which is a correction value of the response compensation flow rate Qo, using, for example, a following relational expression (3). The corrected flow rate Qc is output to the electronic control unit 27.

$$Qc = Qo/(1+\text{Err}) \qquad (3)$$

Conventionally, as described in Patent Document 1, an air flow rate measurement device corrects an air flow rate based on a correction map including a pulsation amplitude ratio of an air flow rate and a pulsation frequency caused by a rotation speed of an internal combustion engine. In Patent Document 1, an air flow rate is corrected only by a pulsation amplitude ratio and a pulsation frequency, and an error caused by a response delay of a sensor and an error caused by a bypass flow path are corrected together. For this reason, a tendency of correction using the pulsation amplitude ratio and the pulsation frequency becomes complicated. As a result, there is a possibility that a measurement accuracy of the air flow rate measurement device may be deteriorated. Therefore, the air flow rate measurement device 1 of the present embodiment improves the measurement accuracy of the air flow rate Q.

[1] The detected flow rate response compensation unit 60 eliminates the deviation of the average value of the detected flow Qd due to the response delay of the sensor, thereby reducing the flow dependence and the frequency dependence of the correction amount depending on the pulsation amplitude Ap. Thus, the error correction unit 75 can correct the response compensation flow rate Qo with high accuracy. Therefore, the measurement accuracy of the air flow rate Q of the air flow rate measurement device 1 is improved.

Figure 10:
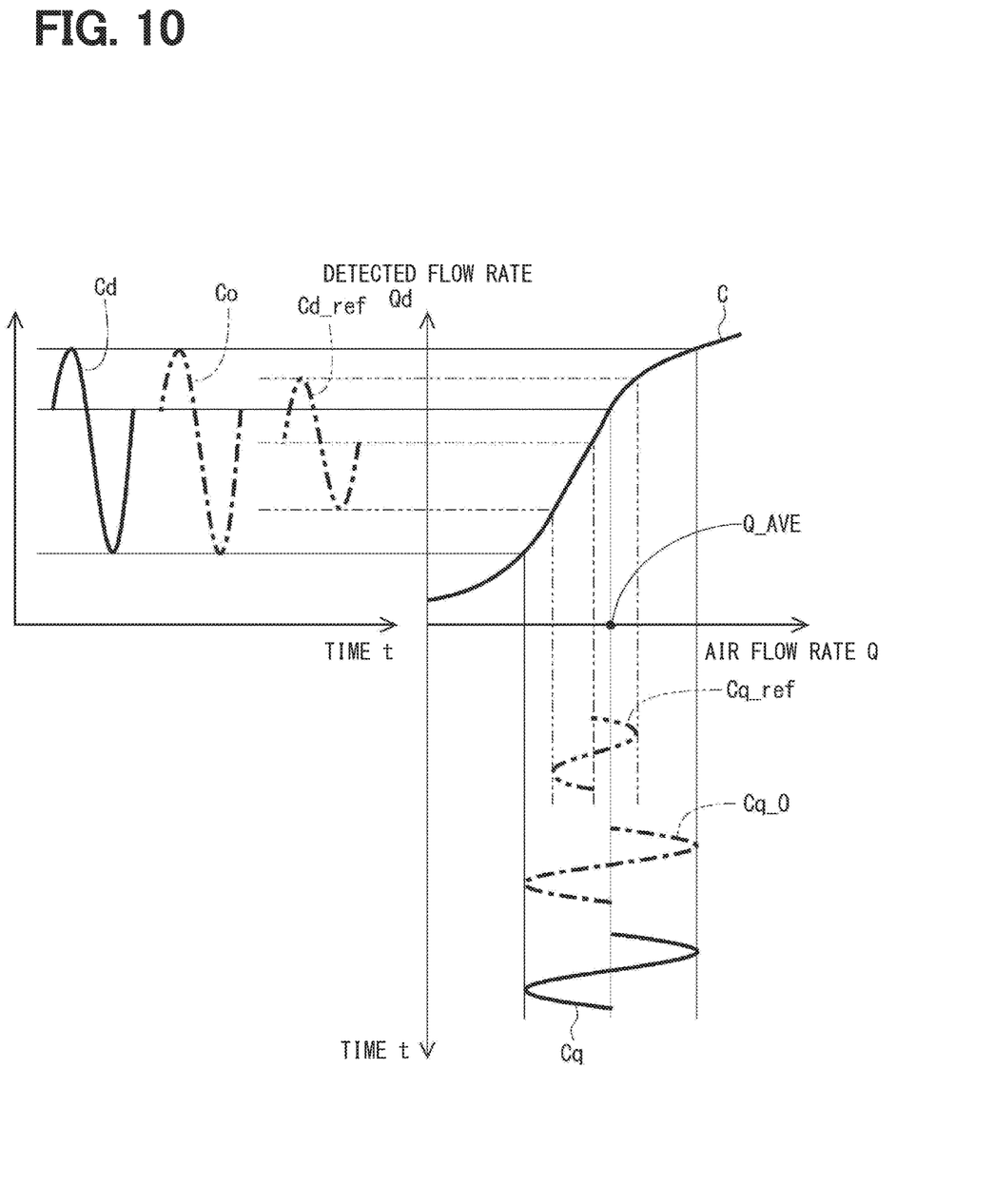
FIG. 10 is a relationship diagram of a time, an air flow rate, and a detected flow rate for explaining a process of the air flow rate measurement device according to one embodiment.

FIG. 10 shows a characteristic curve C of the air flow rate measurement device 1, which is a relationship between the detected flow rate Qd and the air flow rate Q. A curve obtained by plotting the air flow rate Q with respect to time t is referred to as an air flow rate curve Cq. An average value of the air flow rate Q per cycle in the air flow rate curve Cq is defined as an average air flow rate Q_AVE. A curve corresponding to the air flow rate curve Cq and obtained by plotting the detected flow rate Qd with respect to time t is referred to as a detected flow rate curve Cd. A curve obtained by plotting the detected flow rate Qd with respect to time t when the air flow rate Q is corrected only by the pulsation amplitude ratio and the pulsation frequency is referred to as a comparative detected flow rate curve Cd_ref. A curve obtained by plotting the air flow rate Q with respect to time t, which is converted from the comparative detected flow rate curve Cd_ref, is referred to as a comparative air flow rate curve Cq_ref. In the figure, for the sake of simplicity of explanation, an arrangement of the time t is changed and each curve is described.

When the air flow rate Q is corrected only by the pulsation amplitude ratio and the pulsation frequency, a response delay occurs to the detected flow rate Qd due to the heat capacity of the device. Therefore, the maximum amplitude in the comparative detected flow rate curve Cd_ref becomes small. Therefore, when the detected flow rate Qd is converted into the air flow rate Q from the comparative detected flow rate curve Cd_ref, a deviation occurs in the average value of the air flow rate Q. Thereby, there is a possibility that the measurement accuracy may be deteriorated.

In the air flow rate measurement device 1, the detected flow rate response compensation unit 60 advances the response time of the detected flow rate Qd, and compensates for the response delay of the detected flow rate Qd. A curve obtained by plotting the response compensation flow rate Qo with respect to the time t corresponding to the air flow rate curve Cq is referred to as a response compensation flow rate curve Co. A curve of the air flow rate Q corresponding to the response compensation flow rate curve Co is referred to as a compensation air flow rate curve Cq_O.

The amplitude of the response compensation flow curve Co becomes larger than the amplitude of the comparative detected flow rate curve Cd_ref by the detected flow response compensation unit 60. When converted from the response compensation flow curve Co into the air flow rate Q, no deviation occurs in the average value of the air flow rate Q. Therefore, the air flow rate measurement device 1 improves the measurement accuracy of the air flow rate Q.

[2] The detected flow rate response compensation unit 60 calculates so that the flow rate change amount ΔQd increases, and calculates a response compensation flow rate Qo that is a value obtained by compensating for a response delay of the detected flow rate Qd. Thus, the detected flow rate response compensation unit 60 can compensate for the response delay of the detected flow rate Qd by a simple calculation.

[3] The detected flow rate response compensation unit 60 calculates the response compensation flow rate Qo using the sampling time interval Δt and a linear function of the detected flow rate Qd using the time constant T. By using the linear function, the detected flow rate response compensation unit 60 can compensate for the response delay of the detected flow rate Qd by a simple calculation.

[4] The time constant T is set based on the detected flow rate Qd. As a result, the time constant T changes depending on the detected flow rate Qd, so that the detected flow rate response compensation unit 60 can compensate for the response delay of the detected flow rate Qd with high accuracy.

[5] The correction value calculation unit 74 calculates the pulsation correction value Err based on the pulsation amplitude Ap, the pulsation cycle Tp, and the average flow rate Qd_AVE. Accordingly, the error correction unit 75 can further reduce errors due to frequency dependency and flow rate dependency. Therefore, the error correction unit 75 can correct the error with high accuracy.

[6] The first filter 41 can remove or attenuate the detected flow rate Qd at or above the first frequency f1. Thereby, the detected flow rate response compensation unit 60 can convert the detected flow rate Qd into the response compensation flow rate Qo without the noise component of the detected flow rate Qd being amplified by the response compensation. Since the influence of noise can be reduced, the detected flow rate response compensation unit 60 can compensate for the response delay of the detected flow rate Qd with high accuracy.

[7] The first filter 41 has a primary delay element. Therefore, the first filter 41 can remove or attenuate the detected flow rate Qd at or above the first frequency f1 by a simple calculation. The processing load is reduced due to a simple calculation.

[8] The pulsation cycle Tp and the pulsation frequency which is a reciprocal of the pulsation cycle Tp change according to the engine speed N. The first filter 41 sets the first frequency f1 based on the engine speed N. The above configuration prevents the detected flow rate Qd including the pulsation frequency from being removed or attenuated, and the first filter 41 can remove or attenuate only the detected flow rate Qd including the unnecessary frequency.

[9] The first linear converter 31 converts the relationship between the air flow rate Q and the detected flow rate Qd into the linear relationship. The first filter 41 removes or attenuates the detected flow rate Qd at or above the first frequency f1, which has been linearly converted by the first linear converter 31. Thereafter, the first inverse linear converter 51 performs an inverse operation of the first linear converter 31 on the detected flow rate Qd processed by the first filter 41. The first linear converter 31 and the first inverse linear converter 51 make it difficult for the average value of the detected flow rate Qd processed by the first filter 41 to change. Since the average value of the detected flow rate Qd is less likely to change, the detected flow rate response compensation unit 60 can compensate for the response delay of the detected flow rate Qd with high accuracy.

OTHER EMBODIMENTS

[i] The flow rate detection unit 30 may detect a voltage as the detected flow rate Qd. The voltage corresponding to the detected flow rate Qd is defined as a detected voltage Vd. The detected flow rate response compensation unit 60 may compensate for the response delay of the detected voltage Vd and calculate the response compensation voltage Vo corresponding to the response compensation flow rate Qo. The detected flow rate response compensation unit 60 calculates the response compensation voltage Vo based on a following relational expression (4). Vd (k) represents the k-th detected voltage Vd. Vo (k) is a response compensation voltage Vo corresponding to Vd (k). α represents a coefficient. h (V) is a function indicating the input dependency of the output voltage. The coefficient α is set based on whether the difference between Vd (k−1) and Vd (k) is positive or negative. By setting the coefficient α to a different coefficient, the detected flow rate response compensation unit 60 can effectively compensate for the response delay of the detected voltage Vd.

$$Vo(k) = 0.5 \times (Vd(k-1) + Vd(k)) + (\alpha \times h(V)) \times (Vd(k-1) - Vd(k)) \quad (4)$$

[ii] The detected flow rate response compensation unit 60 may advance the phase and increase the amplitude to compensate for the response delay of the detected flow rate Qd. By advancing the phase, the stability, which is the gain margin or the phase margin, increases.

[iii] The electronic control unit 27 may perform processing by the detected flow rate response compensation unit 60, the second linear converter 32, the second filter 42, and the second inverse linear converter 52. Further, the electronic control unit 27 may perform processing by the pulsation cycle calculation unit 71, the average flow rate calculation unit 72, the pulsation amplitude calculation unit 73, the correction value calculation unit 74, and the error correction unit 75.

[iv] The first filter 41 may remove or attenuate the detected flow rate Qd at or above the first frequency f1 by using a moving average. The first filter 41 converts the detected flow rate Qd by extracting m number of the detected flow rates Qd and averaging them. m is a natural number of 2 or more, and is set according to the engine speed N. Similarly to the first filter 41, the second filter 42 may remove or attenuate the detected flow rate Qd at or above the second frequency f2 using the moving average.

[v] The first filter 41 may set the first frequency f1 based on the pulsation cycle Tp. At this time, the pulsation cycle Tp may be calculated by the pulsation cycle calculation unit 71 or may be calculated separately. Further, the first frequency f1 does not depend on the engine speed N or the pulsation cycle Tp, and may be a fixed value. Similarly to the first filter 41, the second filter 42 may set the second frequency f2 based on the pulsation cycle Tp. Further, the second frequency f2 does not depend on the engine speed N or the pulsation cycle Tp, and may have a fixed value.

Figure 11:
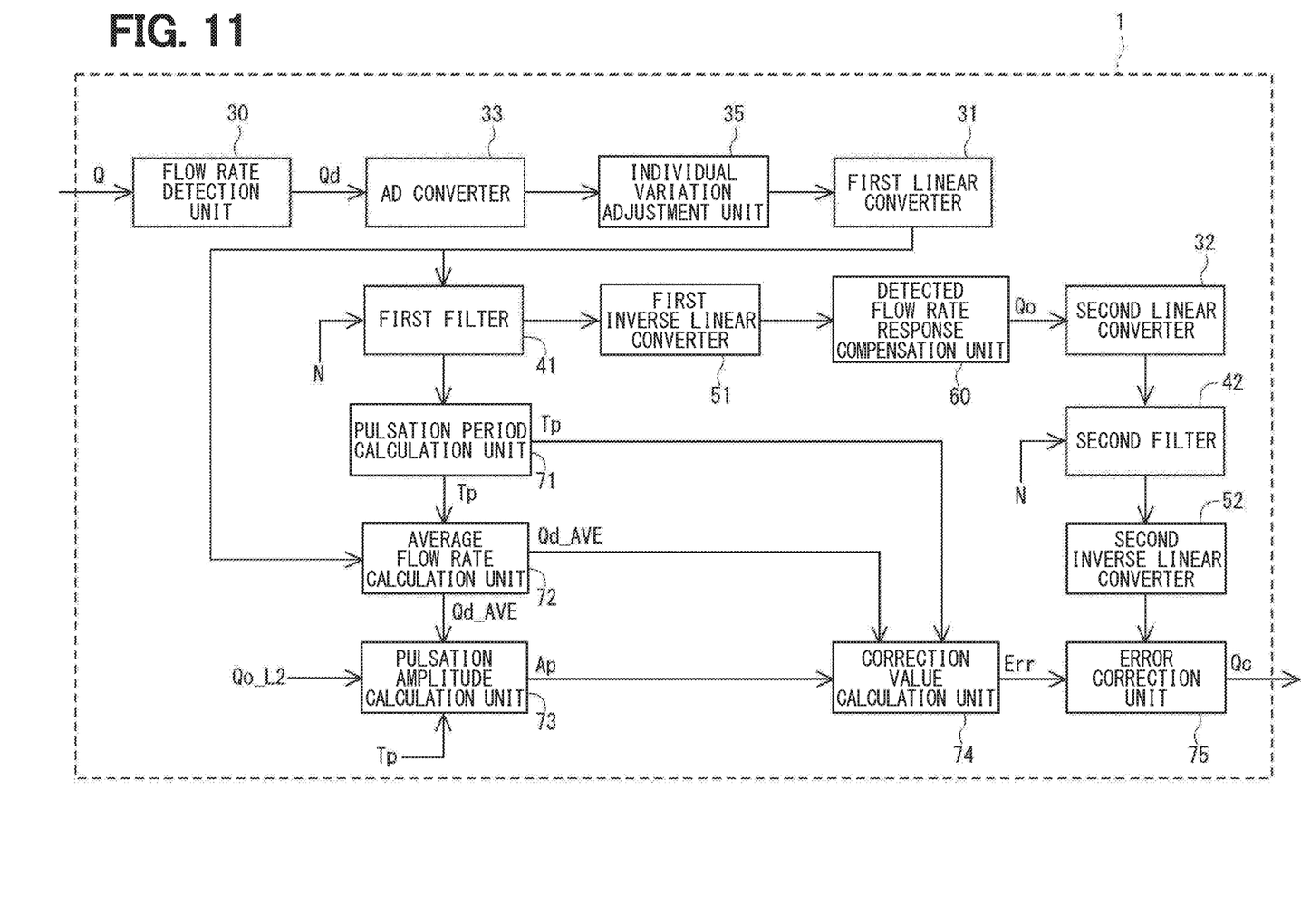
FIG. 11 is a block diagram showing an air flow rate measurement device according to another embodiment.

[vi] The pulsation amplitude calculation unit 73 may divide the difference between the maximum value Qd_LMAX and the minimum value Qd_LMin by 2 to obtain the pulsation amplitude Ap. As illustrated in FIG. 11, the pulsation amplitude calculation unit 73 may calculate the pulsation amplitude Ap using the response compensation flow rate Qo linearly converted by the second linear converter 32. In the figure, the response compensation flow rate Qo that has been linearly converted by the second linear converter 32 is described as Qo_L2.

[vii] The pulsation correction value Err may be a quadratic or higher-order curve with respect to the increase in the pulsation rate P. The pulsation correction value Err may be set using the pulsation amplitude Ap.

The present disclosure should not be limited to the embodiment described above. Various other embodiments may be implemented without departing from the scope of the present disclosure.

The present disclosure has been described based on the embodiments. However, the present disclosure is not limited to the embodiments and structures. This disclosure also encompasses various modifications and variations within the scope of equivalents. Furthermore, various combination and formation, and other combination and formation including one, more than one or less than one element may be made in the present disclosure.

In an assumable example, an air flow rate is corrected only by a pulsation amplitude ratio and a pulsation frequency, and an error caused by a response delay of a sensor and an error caused by a bypass flow path are corrected together. For this reason, a tendency of correction using the pulsation amplitude ratio and the pulsation frequency becomes complicated. As a result, there is a possibility that a measurement accuracy of the air flow rate measurement device may be deteriorated. An object of the present disclosure is to provide an air flow rate measurement device that improves measurement accuracy of the air flow rate.

The air flow rate measurement device according to the present disclosure includes a flow rate detection unit, a detected flow rate response compensation unit, a pulsation amplitude calculation unit, a correction value calculation unit, and an error correction unit.

The flow rate detection unit can detect a detected flow rate which is an output corresponding to a flow rate of air flowing in a flow path connected to an internal combustion engine. The detected flow rate response compensation unit can advance the response time of the detected flow rate, and can calculate a response compensation flow rate which is an output obtained by compensating for the response delay of the detected flow rate. The pulsation amplitude calculation unit can calculate a pulsation amplitude that correlates with the pulsation amplitude in the detected flow rate. The correction value calculation unit can calculate a pulsation correction value, which is a value for correcting a response compensation flow rate, based on the pulsation amplitude. The error correction unit corrects the response compensation flow rate based on the pulsation correction value.

An average value of the detected flow rate due to a response delay of a sensor does not shift by means of the detected flow rate response compensation unit, and a flow rate dependency and a frequency dependency of a correction amount depending on the pulsation amplitude can be reduced. Thereby, the error correction unit can perform the correction of the response compensation flow rate with high accuracy. Therefore, the measurement accuracy of the air flow rate of the air flow rate measurement device is improved.

The invention claimed is:

1. An air flow rate measurement device, comprising:
a flow rate detection unit configured to detect a detected flow rate which is an output corresponding to an air flow rate which is a flow rate of air flowing through a flow passage connected to an internal combustion engine;
a detected flow rate response compensation unit configured to advance a response time of the detected flow rate and configured to calculate a compensation flow rate which is an output obtained by compensating for a response delay of the detected flow rate;
a pulsation amplitude calculation unit configured to calculate a pulsation amplitude correlated with a pulsation amplitude in the detected flow rate;
a correction value calculation unit configured to calculate a pulsation correction value that is a value for correcting the compensation flow rate based on the pulsation amplitude; and
an error correction unit configured to correct the compensation flow rate based on the pulsation correction value.

2. The air flow rate measurement device according to claim 1, wherein
the detected flow rate response compensation unit calculates so that a change amount of the detected flow rate with respect to a time change increases.

3. The air flow rate measurement device according to claim 1, wherein
the detected flow rate response compensation unit calculates the compensation flow rate using a time change, a time constant, and a linear function of the detected flow rate.

4. The air flow rate measurement device according to claim 3, wherein
the time constant is set based on the detected flow rate.

5. The air flow rate measurement device according to claim 1, further comprising:
a pulsation cycle calculation unit configured to calculate a pulsation cycle, which is a cycle of a pulsation in the detected flow rate, based on the detected flow rate with respect to time; and
an average flow rate calculation unit configured to calculate an average flow rate, which is an average value of the detected flow rates, based on the detected flow rate and the pulsation cycle, wherein
the correction value calculation unit calculates the pulsation correction value based on the pulsation amplitude, the pulsation cycle, and the average flow rate.

6. The air flow rate measurement device according to claim 1, further comprising:
a filter configured to remove or attenuate the detected flow rate at or above a predetermined frequency, wherein
the detected flow rate response compensation unit calculates the compensation flow rate based on the detected flow rate calculated via the filter.

7. The air flow rate measurement device according to claim 6, wherein
the filter has a primary delay element.

8. The air flow rate measurement device according to claim 7, wherein
the filter performs a moving average on the detected flow rate.

9. The air flow rate measurement device according to claim 6, further comprising:
a pulsation cycle calculation unit configured to calculate a pulsation cycle that is a cycle of a pulsation in the detected flow rate based on the detected flow rate with respect to time, wherein
the filter sets the predetermined frequency based on the rotation speed of the internal combustion engine or the pulsation cycle.

10. The air flow rate measurement device according to claim 6, further comprising:
a linear converter configured to convert a relationship between the air flow rate and the detected flow rate into a linear relationship; and
an inverse linear converter configured to perform an inverse operation of the linear converter, wherein
the linear converter linearly converts the detected flow rate detected by the flow rate detection unit,
the filter removes or attenuates the component of the detected flow rate at or above the predetermined frequency with respect to a detection value linearly converted by the linear converter, and
the inverse linear converter performs an inverse operation of the linear converter on the detected flow rate processed by the filter.

11. The air flow rate measurement device according to claim 1, wherein
the correction value calculation unit is further configured to calculate a pulsation rate using the pulsation amplitude.

12. The air flow rate measurement device according to claim 1, wherein
the correction value calculation unit is further configured to calculate a pulsation rate using the pulsation amplitude, and determine the pulsation correction value using the pulsation rate.

* * * * *